May 23, 1961 J. GODFREY 2,984,897
FABRICATION OF SEMICONDUCTOR DEVICES
Filed Jan. 6, 1959
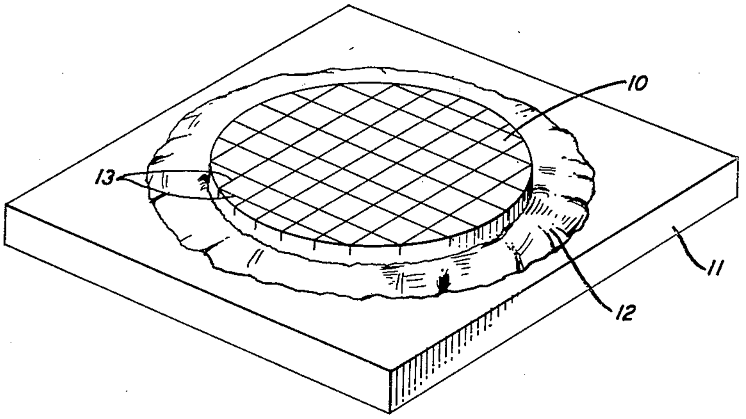
INVENTOR
J. GODFREY
BY [signature]
ATTORNEY United States Patent Office 2,984,897

Patented May 23, 1961

2,984,897

FABRICATION OF SEMICONDUCTOR DEVICES

James Godfrey, Reading, Pa., assignor to Bell Telephone Laboratories, Incorporated, New York, N.Y., a corporation of New York Filed Jan. 6, 1959, Ser. No. 785,143

2 Claims. (Cl. 29—424)

This invention relates to semiconductor devices and, more particularly, to techniques for the fabrication of semiconductor devices.

As is now well known, semiconductor devices, such as transistors and varistors, are made from very small bodies of semiconductor material, such as, for example, germanium, silicon, alloys thereof, or other alloys of group III and group V elements. This material usually is produced in crystalline form, preferably single crystal, in a substantially cylindrical shape, often termed an ingot. A preliminary step in device fabrication then may comprise cutting of the ingot transversely into slices.

From this juncture to the step of permanently mounting the semiconductor element or wafer in its final enclosure, many of the processing steps require temporary mounting of a slice or portion of slice while a mechanical operation is performed thereon. It is desirable that this temporary mounting medium be sufficiently rigid, yet readily removable, with a minimum of apparatus and contamination. The necessity of minimizing contamination is well known in the art of semiconductor fabrication.

Heretofore, waxes and the like have been used for mounting semiconductor bodies during certain shaping and etching operations, particularly for the mounting of slices while they are divided into numerous small wafers. Such materials, however, have undersirable features both from the standpoint of dissolution and ease of removal and that of contamination of the high purity semiconductor material. For the temporary mounting of precious stones the use of ice as a temporary adhesive has been proposed, this involving, however, additional apparatus for producing and maintaining reduced temperatures. Because of the aforementioned difficulties, it is desirable to provide a mounting material which is adhesive at room temperatures, but which is readily and completely dissoluble at slightly elevated temperatures and which is not deleterious to the semiconductor material.

It is therefore an object of this invention to provide an improved temporary mounting technique for semiconductor materials while they are subjected to mechanical cutting or shaping operations.

It is a further object to provide an improved mounting material which requires a minimum of accessory apparatus for application and removal of the material.

A further object of this invention is a temporary mounting material which is readily and completely dissoluble in water.

In accordance with this invention, a slice of semiconductor material, for example, germanium, is secured on a mounting plate preliminary to the scribing and etching operation by first coating the surface of the plate with molten magnesium nitrate hexahydrate, $Mg(NO_3)_2 \cdot 6H_2O$. The semiconductor slice then is placed on this coating which rapidly solidifies at room temperature to provide a firm mounting for the slice during ensuing fabrication steps.

Upon completion of these operations, the magnesium salt is removed completely by washing in pure hot water.

A feature of this invention therefore is the use of inorganic hydrated salts having relatively low transition or melting temperatures. Such salts characteristically melt without dehydrating.

A further feature is the use of a salt as a mounting medium which is completely soluble in water and is removable without leaving contaminating residue.

The following more detailed description, taken in connection with the drawing which shows a slice of semiconductor material secured to a mounting plate, will enable a better understanding of the invention and its other objects, features, and advantages.

As shown in the drawing, a germanium slice 10 is secured to a glass mounting plate 11. The surface of the slice is to be cut or scribed with a grid of lines 13 which penetrate sufficiently deep to enable breaking of the slice into a number of small wafers, each of which will constitute the basic element of a semiconductor device such as a transistor or varistor.

The slice 10 is secured to the glass by a thin layer 12 of magnesium nitrate hexahydrate. In the solid form this salt has a glassy appearance and has sufficient strength to retain the slice 10 securely in position during the operations required to produce the grid of lines on the slice. The specific steps of mounting the slice may vary but one preferred method is to maintain in molten condition a quantity of magnesium nitrate hexahydrate by heating in a small dish or pot. The temperature need be only slightly in excess of 95 degrees centigrade to maintain such condition.

The mounting faces of the slices then are dipped in the molten material and immediately applied to the glass base 11. The salt quickly solidifies, providing a relatively strong adhesive bond.

Alternatively, an aqueous or alcoholic solution of the salt may be applied to the mounting surface by brushing or by means of an applicator, such as an eyedropper. The slice then is applied to the area thus coated; and the bond accomplished by brief heating followed by a cooling to solidify the salt.

Another alternative is first to apply the salt in crystalline form to the surface of the mounting plate and then to heat the material gently to render the salt molten. The slice of semiconductor material then is simply applied to the coated area as in the previously described arrangement.

While the germanium slice is temporarily mounted, the scribe lines 13 are produced by means of a sharp pointed tool. Alternatively, the slice may be cut in accordance with the same pattern using fine cutting wheels or the slice may be divided into circular wafers using ultrasonic cutting means.

Following the cutting or shaping operations, it is essential that the semiconductor material be removed from the mounting plate with a minimum of damage to the material and with a minimum of residue, particularly of a contaminating character. In accordance with this invention, the solidified salt, magnesium nitrate hexahydrate, is simply and completely removed by gently washing the mounted slice in warm water of high purity at a temperature of about 70 degrees centigrade. This operation dissolves the salt and enables its removal in solution. No material remains adherent to either the semiconductor material or the mounting plate which might require other special treatment for its removal.

Thus, this invention resides in a simple, yet extremely advantageous method of mounting material, such as semiconductor material which is extremely sensitive to foreign impurities and somewhat sensitive to heat for interim processing operations. Although the preferred embodiment involves the use of magnesium nitrate hexahydrate, other inorganic hydrated salts having transition points between 40 degrees centigrade and 120 degrees centigrade are also suitable. Such other salts may include ammonium aluminum sulfate, $NH_4Al(SO_4)_2 \cdot 12H_2O$; cobaltous sulfate, $CoSO_4 \cdot 7H_2O$; and potassium chromium sulfate, $KCr(SO_4)_2 \cdot 12H_2O$. However, magnesium nitrate hexahydrate is preferred because of its availability at low cost, and ease of application and removal.

Although the invention has been disclosed in terms of preferred embodiments, it will be understood that variations may be devised by those skilled in the art which are within the scope and spirit of the invention.

What is claimed is:

1. In the fabrication of a semiconductor device the steps of temporarily mounting a semiconductor body on a base member for processing which comprise applying a coating of a molten inorganic hydrated salt selected from the group consisting of magnesium nitrate hexahydrate, ammonium aluminum sulfate, cobaltous sulfate, and potassium chromium sulfate on at least one of the surfaces being joined, applying the semiconductor body to the base member and allowing the assembly to cool thereby to solidify the salt, performing operations on said body, and washing the assembly in warm water thereby removing said salt and freeing said semiconductor body.

2. In the fabrication of a semiconductor body the process in accordance with claim 1 in which the inorganic hydrated salt is magnesium nitrate hexahydrate.

References Cited in the file of this patent

UNITED STATES PATENTS

| | | |
|---|---|---|
| 1,982,932 | Scribner | Dec. 4, 1934 |
| 2,085,129 | Stoewener | June 29, 1937 |
| 2,717,841 | Biefeld | Sept. 13, 1955 |
| 2,762,954 | Leifer | Sept. 11, 1956 |